(12) United States Patent
Abdelshahid et al.

(10) Patent No.: US 12,323,907 B2
(45) Date of Patent: Jun. 3, 2025

(54) USER APPLICATION DELIVERY OVER AD-HOC WIRELESS COMMUNICATION NETWORKS

(71) Applicant: T-MOBILE INNOVATIONS LLC, Overland Park, KS (US)

(72) Inventors: Wafik Abdelshahid, Kenmore, WA (US); Yasmin Karimli, Kirkland, WA (US); Ming Shan Kwok, Seattle, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 420 days.

(21) Appl. No.: 17/875,200

(22) Filed: Jul. 27, 2022

(65) Prior Publication Data
US 2024/0040487 A1    Feb. 1, 2024

(51) Int. Cl.
*H04W 48/16*    (2009.01)
*H04W 8/00*     (2009.01)
*H04W 76/15*    (2018.01)
*H04W 84/18*    (2009.01)

(52) U.S. Cl.
CPC .......... *H04W 48/16* (2013.01); *H04W 8/005* (2013.01); *H04W 76/15* (2018.02); *H04W 84/18* (2013.01)

(58) Field of Classification Search
CPC ..... H04W 48/16; H04W 76/15; H04W 8/005; H04W 84/18; H04W 40/24; H04W 8/00; H04B 1/7085; H04L 69/14
See application file for complete search history.

(56) References Cited

U.S. PATENT DOCUMENTS

| | | | |
|---|---|---|---|
| 7,464,272 B2 | 12/2008 | Danieli | |
| 7,695,370 B2 | 4/2010 | Liu et al. | |
| 8,118,679 B2 | 2/2012 | Gagner | |
| 8,171,155 B2 | 5/2012 | Ruppert | |
| 9,630,113 B1 | 4/2017 | Jensen | |
| 10,530,569 B2 | 1/2020 | Bisti et al. | |
| 10,967,276 B2 | 4/2021 | Jensen | |
| 11,154,783 B1 | 10/2021 | Koch et al. | |
| 2009/0034009 A1* | 2/2009 | Johnson | H04N 1/32203 358/3.28 |
| 2010/0022231 A1* | 1/2010 | Heins | H04M 3/4872 455/418 |

(Continued)

*Primary Examiner* — Mewale A Ambaye

(57) ABSTRACT

Spatial compute devices form an ad-hoc communication network that comprises includes point-to-point wireless links between the spatial compute devices. The spatial compute devices exchange application data for a user application over the ad-hoc communication network. The spatial compute devices indicate their ad-hoc communication network, user application, and application users to an application server system. A new spatial compute device detects the ad-hoc communication network and queries the application server system. The application server system responds to the new device with the application users that are currently using the user application over the ad-hoc communication network. The new device presents to a user the application users that are currently using the user application over the ad-hoc network, and in response, receives a user selection of the user application. The new device wirelessly exchanges new application data for the user application with the other application users over the ad-hoc communication network.

20 Claims, 10 Drawing Sheets

(56) References Cited

U.S. PATENT DOCUMENTS

| | | | |
|---|---|---|---|
| 2010/0202320 A1* | 8/2010 | Bennett | H04W 84/18 |
| | | | 370/254 |
| 2012/0010734 A1 | 1/2012 | Youm | |
| 2012/0064968 A1 | 3/2012 | Youm et al. | |
| 2014/0123214 A1* | 5/2014 | Black | H04L 63/083 |
| | | | 726/1 |
| 2016/0241610 A1* | 8/2016 | Zhang | H04L 65/611 |
| 2020/0364986 A1* | 11/2020 | Amaitis | G07F 17/3225 |
| 2022/0286845 A1* | 9/2022 | Vanoss | H04L 63/0876 |
| 2023/0247421 A1* | 8/2023 | Maknickas | H04L 63/20 |
| | | | 726/2 |
| 2023/0319594 A1* | 10/2023 | Nagrockas | H04W 12/0471 |
| | | | 370/252 |

\* cited by examiner

USER APPLICATION DELIVERY OVER AD-HOC WIRELESS COMMUNICATION NETWORKS

TECHNICAL BACKGROUND

Wireless communication networks provide wireless data services to wireless user devices. Exemplary wireless data services include user data messaging, machine-control, internet-access, media-streaming, and social-networking. Exemplary wireless user devices comprise phones, computers, vehicles, robots, and sensors. The wireless user devices execute user applications that use the wireless data services. For example, a smartphone may execute a social-networking application that communicates with a content server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The wireless network elements comprise Access and Mobility Management Functions (AMFs), Session Management Functions (SMFs), User Plane Functions (UPFs), and the like.

The wireless user devices may directly communicate over point-to-point wireless links. The wireless user devices may form ad-hoc wireless networks that are comprised of these point-to-point wireless links. The ad-hoc wireless networks use wireless protocols like Direct Short Range Radio Communication (DSRC), 5GNR, WIFI, Bluetooth Low Energy (BLE), Near Field Communications (NFC), and the like. The ad-hoc wireless networks spontaneously form based on geographic proximity that triggers the automatic creation of point-to-point links and associated networking capabilities. For example, a pair of proximate smartphones may discover one another and establish WIFI links to form an ad-hoc wireless network. A newly arriving smartphone may discover the existing pair and establish new WIFI links with each smartphone to grow the ad-hoc wireless network. Additional smartphones may join the ad-hoc wireless network in a like manner.

The wireless user devices may host user applications that use the ad-hoc wireless networks. For example, vehicle-transceivers may host anti-collision Vehicle-to-Vehicle (V2V) applications that use ad-hoc wireless networks among proximate vehicles to avoid crashes. In another example, a gamer's smart-goggles may host a user application that uses an ad-hoc wireless network to interact with other nearby smart-goggles to present interactive gameplay to multiple gamers.

The wireless user devices interact with wireless network cores to obtain network services like internet access and data messaging. The wireless user devices also interact with one another to obtain wireless ad-hoc services like interactive gaming. The wireless network cores help the ad-hoc wireless networks by authorizing the wireless user devices and scheduling resources for the wireless user devices. Unfortunately, the wireless network cores do not effectively interact with the wireless user devices to support the user applications that use the ad-hoc wireless networks. Moreover, the wireless user devices do not efficiently interact with the application users to control their use of their user applications over the ad-hoc wireless networks.

TECHNICAL OVERVIEW

Spatial compute devices form an ad-hoc communication network that comprises point-to-point wireless links between the spatial compute devices. The spatial compute devices exchange application data for a user application over the ad-hoc communication network. The spatial compute devices indicate their ad-hoc communication network, user application, and application users to an application server system. A new spatial compute device detects the ad-hoc communication network and queries the application server system. The application server system responds to the new spatial compute device with the application users that are currently using the user application over the ad-hoc communication network. The new spatial compute device presents to a user the application users that are currently using the user application over the ad-hoc network, and in response, receives a user selection of the user application. The new spatial compute device wirelessly exchanges application data for the user application with the other application users over the ad-hoc communication network.

DETAILED DESCRIPTION

Figure 1:
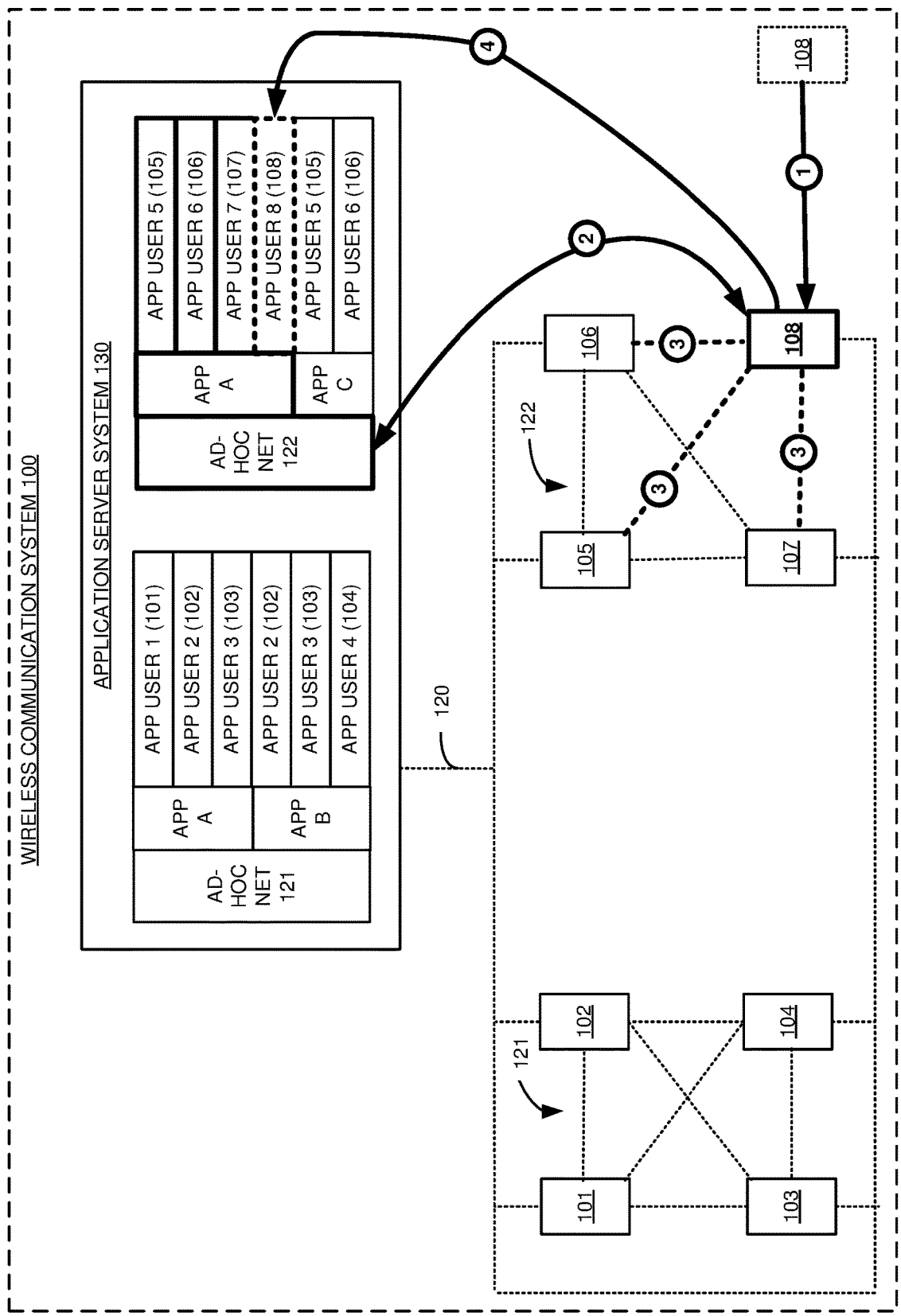
FIG. 1 illustrates an exemplary wireless communication system to deliver user applications to spatial compute devices over ad-hoc communication networks.

FIG. 1 illustrates exemplary wireless communication system 100 to deliver user applications to spatial compute devices 101-108 over ad-hoc communication networks 121-122. Wireless communication system 100 comprises spatial compute devices 101-108, access networks 120, ad-hoc communication networks 121-122, and application server system 130. Spatial compute devices 101-108 comprise phones, computers, goggles, controllers, and/or some other user apparatus with communication circuitry that is configured to operate as described below. The user applications are designated alphabetically and may comprise gaming applications, Augmented Reality (AR) applications, Virtual Reality (VR) applications, and/or some other type of user software.

Access networks 120 comprise wireless networks, wireline networks, satellite systems, and/or some other type of data communication equipment. Ad-hoc networks 121-122 comprise point-to-point wireless links between pairs of spatial compute devices 101-108 that are rapidly formed based on public standards and geographic proximity. Ad-hoc networks 121-122 may use Fifth Generation New Radio (5GNR), Direct Short Range Radio Communication (DSRC), Institute of Electrical and Electronic Engineers (IEEE) 802.11 (WIFI), Bluetooth Low Energy (BLE), Near Field Communications (NFC), and/or some other ad-hoc networking protocol. Application server system 130 comprises one or more networked computers with communication and database software that are configured to operate as described below. Application server system 130 maintains a data structure that associates individual application users with their individual user applications. The data structure also associates the individual user applications with their individual ad-hoc communication networks.

Various examples of network operation and configuration are described herein. In some examples, spatial compute devices 101-107 wirelessly form ad-hoc communication networks 121-122 while spatial compute device 108 (represented by dotted lines) is still located away from ad-hoc communication networks 121-122. Spatial compute devices 101-107 wirelessly exchange application data between user applications A-C for application users 1-7 over ad-hoc communication networks 121-122. Spatial compute devices 101-107 individually transfer network data to application server system 130 over access networks 120 that indicates: 1) the individual ad-hoc communication networks 121-122 that they currently use, 2) the user applications A-C that they currently use over ad-hoc communication networks 121-122, and 3) the individual application users 1-7 that currently use individual user applications A-C over the individual ad-hoc networks 121-122. Individual application users are typically identified by self-selected usernames, although other user indicators could be used. Application server system 130 receives and stores the network data.

As indicated by arrow #1, spatial compute device 108 (now represented by solid bold lines) moves toward and wirelessly detects ad-hoc communication network 122. As indicated by arrow #2, spatial compute device 108 responsively transfers a network query to application server system 130 over access networks 120 that indicates detected ad-hoc communication network 122. Application server system 130 receives the network query and responsively translates an identifier for ad-hoc communication network 123 into information for a network response that indicates user application A and its current application users 5-7 along with user application C and its current application users 5-6. As indicated by arrow #2, application server system 130 transfers the network response to spatial compute device 108. Spatial compute device 108 receives the network response and responsively presents that application users 5, 6, and 7 are using user application A over ad-hoc communication network 122, and that application users 5 and 6 are using user application C over ad-hoc communication network 122. In response, spatial compute device 108 receives a user selection of user application A. As indicated by lines #3, spatial compute device 108 establishes point-to-point links with spatial compute devices 105-107 to join ad-hoc communication network 122. Application user 8 in spatial compute device 108 wirelessly exchanges application data for selected user application A with application users 6, and 7 over ad-hoc communication network 122. As indicated by arrow #4, spatial compute device 108 transfers network data to application server system 130 that indicates that application user 8 is currently using user application A over ad-hoc network 122. Application server system 130 receives, stores, and subsequently serves the new network data for ad-hoc communication network 122.

Advantageously, wireless communication system 100 effectively interacts with spatial compute devices 101-108 to support user applications A-C that use ad-hoc communication networks 121-122. Moreover, spatial compute devices 101-108 efficiently interact with application users 1-8 to control their use of ad-hoc communication networks 121-122 and user applications A, B, and C.

In some examples, spatial compute device 108 presents a network option to use application server system 130 for user applications A or C instead of ad-hoc communication network 122. Spatial compute device 108 may receive a user selection of the network option with users 5-7 and establish connectivity to application users 5-7 in spatial compute devices 105-107 through application server system 130. Application user 8 in spatial compute device 108 then exchanges application data for user application A with the same users over application server system 130 instead of ad-hoc communication network 122. Spatial compute device 108 may also receive a user selection of another network option to establish connectivity to different application users of the user application through application server system 130.

Spatial compute devices 101-108 comprise radios that wirelessly communicate using wireless protocols like 5GNR, DSRC, WIFI, BLE, NFC, Low-Power Wide Area Network (LP-WAN), Code Division Multiple Access (CDMA), Frequency Division Multiple Access (FDMA), and Time Division Multiple Access (TDMA). Spatial compute devices 101-108 and application server system 130 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network applications. The microprocessors retrieve the software from the memories and execute the software to drive the operation of wireless communication system 100 as described herein.

Figure 2:
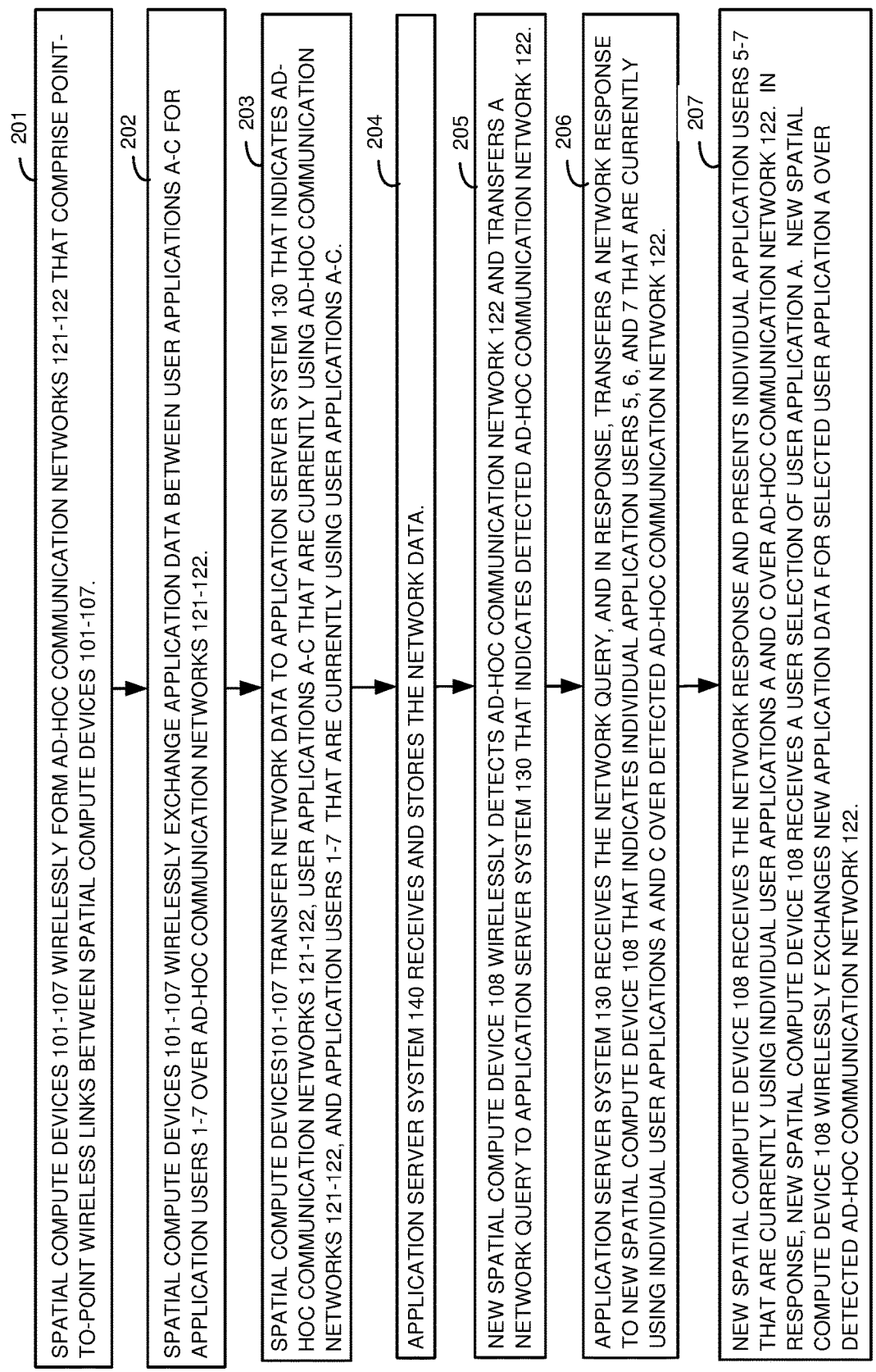
FIG. 2 illustrates an exemplary operation of the wireless communication system to deliver the user applications to the spatial compute devices the over the ad-hoc communication networks.

FIG. 2 illustrates an exemplary operation of wireless communication system 100 to deliver user applications to spatial compute devices 101-108 over ad-hoc communication networks 121-122. The operation may vary in other examples. Spatial compute devices 101-107 wirelessly form ad-hoc communication networks 121-122 that comprise point-to-point connections between spatial compute devices 101-107 (201). Spatial compute devices 101-107 wirelessly exchange application data between the user applications for the application users A-C over ad-hoc communication networks 121-122 (202). Spatial compute devices 101-107 transfer network data to application server system 130 over access networks 120 that indicates: the individual ad-hoc communication networks 121-122 that they currently use, the individual user applications A-C that they currently use over which individual ad-hoc communication networks 121-122, and the individual application users 1-7 that are currently using which user applications A-C (203). Application server system 130 receives and stores the network data (204). New spatial compute device 108 wirelessly detects ad-hoc communication network 122 and transfers a network query to application server system 130 over access networks 120 that indicates detected ad-hoc communication network 122 (205). Application server system 120 receives the network query and responsively transfers a network response that indicates the current user applications and their current application users for ad-hoc communication network 122 (206). Application server system 130 transfers the network response to new spatial compute device 108 (206). New spatial compute device 108 receives the network response and graphically presents the individual application users that are the individual user applications over ad-hoc communication network 122 (206). New spatial compute device 108 receives a user selection of user application A over ad-hoc communication network 122 and establishes point-to-point wireless links with spatial compute devices 105-107 in ad-hoc communication network 122. New spatial compute device 108 wirelessly exchanges application data for the selected user application A with spatial compute devices 105-107 over ad-hoc communication network 122 (207).

Figure 3:
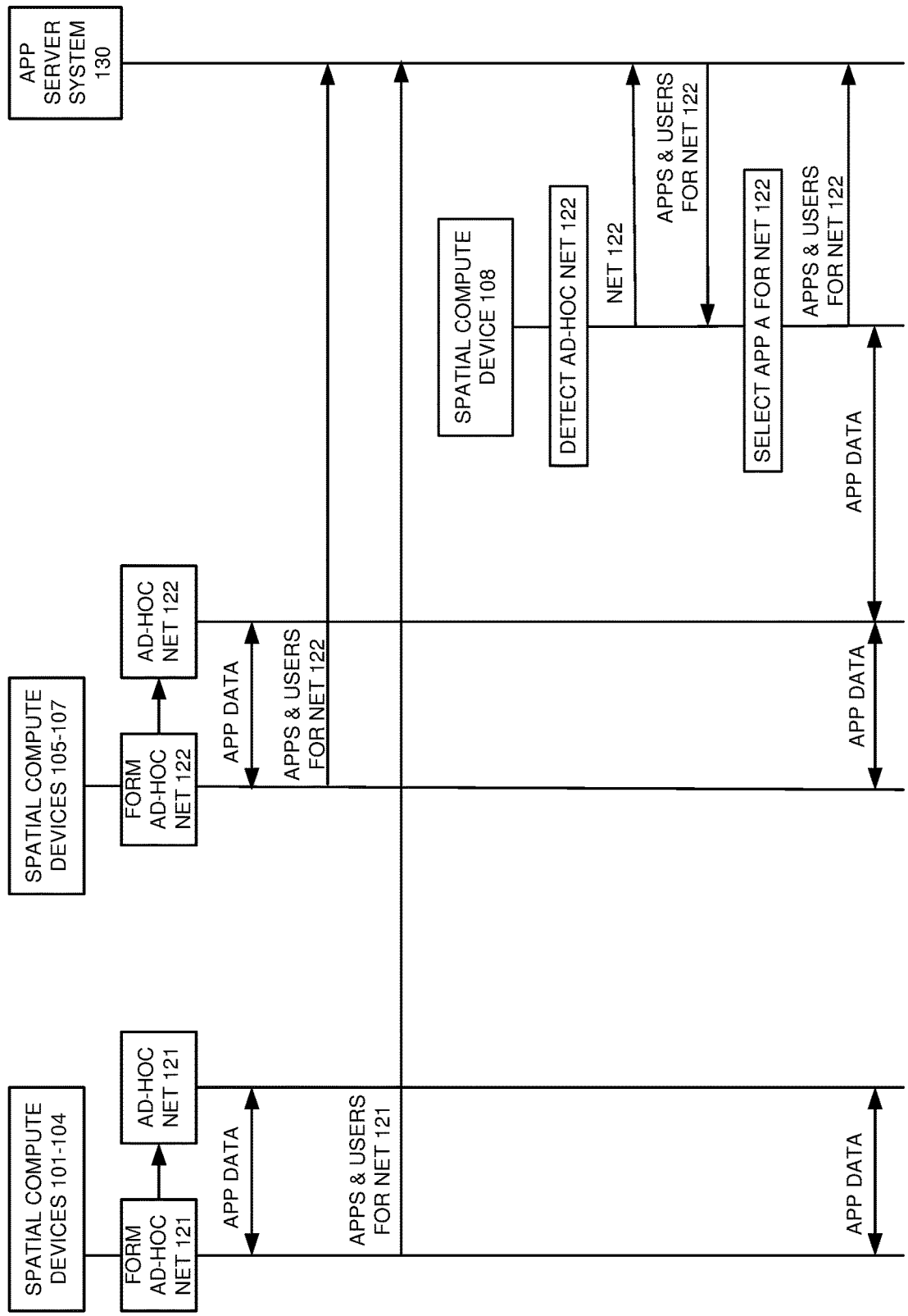
FIG. 3 illustrates an exemplary operation of the wireless communication system to deliver the user applications to the spatial compute devices over the ad-hoc communication networks.

FIG. 3 illustrates an exemplary operation of the wireless communication system 100 to deliver the user applications to spatial compute devices 101-108 the over ad-hoc communication networks 121-122. The operation may vary in other examples. Spatial compute devices 101-104 wirelessly form ad-hoc communication network 121. Spatial compute devices 101-104 wirelessly exchange application data over ad-hoc communication network 121. Spatial compute devices 105-107 wirelessly form ad-hoc communication network 122. Spatial compute devices 105-107 wirelessly exchange application data over ad-hoc communication network 122. Spatial compute devices 101-107 transfer network data to application server system 130 that indicates their individual apps A-C and their individual application users 1-7 for ad-hoc networks 121-122. The indication of application users 1-7 comprises self-selected usernames by the users of spatial compute devices 101-107 or some other user identifiers.

Spatial compute device 108 wirelessly detects ad-hoc communication network 122 and transfers a network query to application server system 130 for ad-hoc communication network 122. Application server system 130 transfers a response to spatial compute device 108 that indicates the individual application users and the individual user applications for ad-hoc communication network 122. Spatial compute device 108 receives the network response and selects user application A in ad-hoc communication network 122—typically after a graphic interaction with the user. Spatial compute device 108 establishes point-to-point wireless links with spatial compute devices 105-107 to join ad-hoc communication network 122. Spatial compute device 108 transfers network data to application server system 130 that indicates that application user 8 is currently using user application A over ad-hoc network 122. The indication of application user 8 comprises a self-selected username by the user of spatial compute device 108 or some other user identifier. Application users 1-4 in spatial compute devices 101-104 wirelessly exchange application data for their user applications over ad-hoc communication network 121. Application users 5-8 of spatial compute devices 105-108 wirelessly exchange application data for their user applications over ad-hoc communication network 122.

Figure 4:
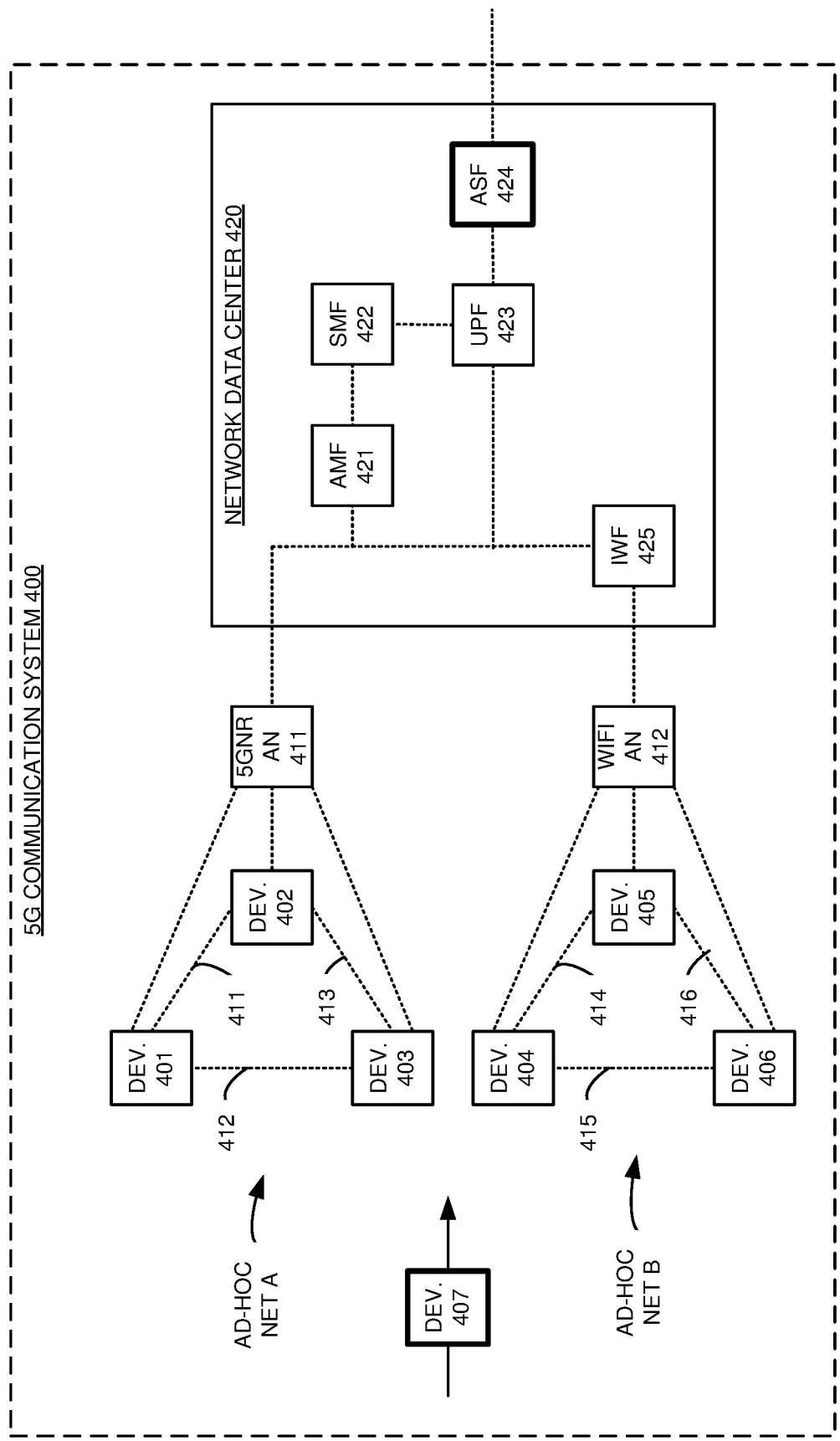
FIG. 4 illustrates an exemplary Fifth Generation (5G) communication network to deliver user applications to spatial compute devices over ad-hoc communication networks.

FIG. 4 illustrates exemplary Fifth Generation (5G) communication network 400 to deliver user applications to spatial compute devices (DEV.) 401-407 over ad-hoc communication networks A and B. 5G communication system 400 comprises an example of wireless communication system 100, although system 100 may differ. 5G communication system 400 comprises: spatial compute devices 401-407, Access Nodes (ANs) 411-412, and network data center 420. Network data center 420 comprises Access and Mobility Management Function (AMF) 421, Session Management Function (SMF) 422, User Plane Function (UPF) 423, Application Server Function (ASF) 424, and Interworking Function (IWF) 425. Network data center 420 typically includes additional network functions like Network Repository Function (NRF) and Unified Data Management (UDM) that are omitted for clarity.

Spatial compute device 401 wirelessly attaches to 5GNR AN 411. Spatial compute device 401 registers with AMF 421 over 5GNR AN 411. AMF 421 authenticates and authorizes spatial compute device 401 for data services that include connectivity to ASF 424. AMF 421 transfers spatial compute device context for the services for spatial compute device 401 to SMF 423, and SMF 423 transfers the spatial compute device context to UPF 423. AMF 421 transfers spatial compute device context for the services for spatial compute device 401 to 5GNR AN 411, and 5GNR AN 411 transfers the spatial compute device context to spatial compute device 401. To initiate a Virtual Reality (VR) application with other spatial compute devices, spatial compute device 401 broadcasts a beacon for ad-hoc network A. Over 5GNR AN 411 and UPF 423, spatial compute device 401 notifies ASF 424 of the VR application that is available over ad-hoc communication network A along with the VR application username for spatial compute device 401. The user of spatial compute device 401 selects a network name for ad-hoc communication network A and the VR application username.

Spatial compute device 402 wirelessly attaches to 5GNR AN 411. Spatial compute device 402 registers with AMF 421 over 5GNR AN 411. AMF 421 authenticates and authorizes spatial compute device 402 for services that include connectivity to ASF 424. AMF 421 transfers spatial compute device context for the services for spatial compute device 402 to SMF 423, and SMF 423 transfers the spatial compute device context to UPF 423. AMF 421 transfers spatial compute device context for the services for spatial compute device 402 to 5GNR AN 411, and 5GNR AN 411 transfers the spatial compute device context to spatial compute device 402. Spatial compute device 401 detects ad-hoc communication network A and queries ASF 424 for corresponding information over 5GNR AN 411 and UPF 423. ASF 424 translates ad-hoc communication network A into the VR application and VR application username for spatial compute device 401. ASF 424 indicates the VR application on ad-hoc communication network A and the VR application username for spatial compute device 401 to spatial compute device 402. Spatial compute device 402 displays a prompt to use the VR application with the VR application username for spatial compute device 401 over ad-hoc communication network A. In response, spatial compute device 402 receives a user instructions to join ad-hoc communication network A and use the VR application with a select VR application username. Spatial compute devices 401-402 establish point-to-point 5GNR link 411. Spatial compute devices 401-402 exchange VR application data over 5GNR link 411 in ad-hoc communication network A. Spatial compute device 402 notifies ASF 424 of its VR application username and its use of the VR application over ad-hoc communication network A.

Spatial compute device 403 wirelessly attaches to 5GNR AN 411. Spatial compute device 403 registers with AMF 421 over 5GNR AN 411. AMF 421 authenticates and authorizes spatial compute device 403 for services that include connectivity to ASF 424. AMF 421 transfers spatial compute device context for the services for spatial compute device 403 to SMF 423, and SMF 423 transfers the spatial compute device context to UPF 423. AMF 421 transfers spatial compute device context for the services for spatial compute device 403 to 5GNR AN 411, and AN 411 transfers the spatial compute device context to spatial compute device 403. Spatial compute device 403 detects ad-hoc communication network A and queries ASF 424 over 5GNR AN 411 and UPF 423. ASF 424 translates ad-hoc communication network A into the VR application and the VR application usernames for spatial compute devices 401-402. ASF 424 indicates the VR application on ad-hoc communication network A and the VR application usernames for spatial compute devices 401-402 to spatial compute device 403. Spatial compute device 403 displays a prompt to use the VR application with the VR application usernames for spatial compute devices 401-402 over ad-hoc communication network A. In response, spatial compute device 403 receives user instructions to join ad-hoc communication network A and use the VR application. Spatial compute device 403 establishes point-to-point 5GNR links 412-413 with respective spatial compute devices 401-402. Spatial compute devices 401-403 exchange VR application data over 5GNR links 411-413 in ad-hoc communication network A. Spatial compute device 403 notifies ASF 424 of its VR application username and its use of the VR application over ad-hoc communication network A. Spatial compute devices 401-403 may use additional applications over ad-hoc communication network A in a like manner.

Spatial compute device 404 wirelessly attaches to WIFI AN 412. Spatial compute device 404 establishes a secure tunnel with IWF 425 over WIFI AN 412. Spatial compute device 404 registers with AMF 421 over WIFI AN 412 and IWF 425. AMF 421 authenticates and authorizes spatial compute device 404 for data services that include connectivity to ASF 424. AMF 421 transfers spatial compute device context for the services for spatial compute device 404 to SMF 423, and SMF 423 transfers the spatial compute device context to UPF 423. AMF 421 transfers spatial compute device context for the services for spatial compute device 404 to IWF 425 and to spatial compute device 404 over IWF 425 and WIFI AN 412. To initiate an interactive gaming application with other spatial compute devices, spatial compute device 404 broadcasts a beacon for ad-hoc communication network B. Over WIFI AN 412, IWF 425, and UPF 423, spatial compute device 404 notifies ASF 424 of the interactive gaming application that is available over ad-hoc communication network B along with the gaming application username for spatial compute device 404.

Spatial compute device 405 wirelessly attaches to WIFI AN 412. Spatial compute device 405 establishes a secure tunnel with IWF 425 over WIFI AN 412. Spatial compute device 405 registers with AMF 421 over WIFI AN 412 and IWF 425. AMF 421 authenticates and authorizes spatial compute device 405 for services that include connectivity to ASF 424. AMF 421 transfers spatial compute device context for the services for spatial compute device 405 to SMF 423, and SMF 423 transfers the spatial compute device context to UPF 423. AMF 421 transfers spatial compute device context for the services for spatial compute device 405 to IWF 425 and to spatial compute device 405 over IWF 425 and WIFI AN 412. Spatial compute device 405 detects ad-hoc communication network B and queries ASF 424 for corresponding information over WIFI AN 411, IWF 425, and UPF 423. ASF 424 translates ad-hoc communication network B into the interactive gaming application and gaming application username for spatial compute device 404. ASF 424 indicates the interactive gaming application on ad-hoc communication network B and the gaming application username for spatial compute device 404 to spatial compute device 405. Spatial compute device 405 displays a prompt to use the interactive gaming application with the gaming application username for spatial compute device 404 over ad-hoc communication network B. In response, spatial compute device 405 receives a user instruction to join ad-hoc communication network B and use the interactive gaming application. Spatial compute devices 404-405 establish point-to-point Direct Short Range Radio Communication (DSRC) link 414. Spatial compute devices 404-405 exchange interactive gaming application data over DSRC link 414 in ad-hoc communication network B. Spatial compute device 405 notifies ASF 424 of its gaming application username and its use of the interactive gaming application over ad-hoc communication network B.

Spatial compute device 406 wirelessly attaches to WIFI AN 412. Spatial compute device 406 establishes a secure tunnel with IWF 425 over WIFI AN 412. Spatial compute device 406 registers with AMF 421 over WIFI AN 412 and IWF 425. AMF 421 authenticates and authorizes spatial compute device 406 for services that include connectivity to ASF 424. AMF 421 transfers spatial compute device context for the services for spatial compute device 406 to SMF 423, and SMF 423 transfers the spatial compute device context to UPF 423. AMF 421 transfers spatial compute device context for the services for spatial compute device 406 to IWF 425 and to spatial compute device 406 over IWF 425 and WIFI AN 412. Spatial compute device 406 detects ad-hoc communication network B and queries ASF 424 for corresponding information over WIFI AN 411, IWF 425, and UPF 423. ASF 424 translates ad-hoc communication network B into the interactive gaming application and gaming application usernames for spatial compute devices 404-405. ASF 424 indicates the interactive gaming application on ad-hoc communication network B and the gaming application usernames for spatial compute devices 404-405 to spatial compute device 406. Spatial compute device 406 displays a prompt to use the interactive gaming application with the gaming application usernames for spatial compute devices 404-405 over ad-hoc communication network B. In response, spatial compute device 406 receives a user instruction to join ad-hoc communication network B and use the interactive gaming application. Spatial compute device 406 and spatial compute devices 404-405 establish respective DSRC links 415-416. Spatial compute devices 404-406 exchange interactive gaming application data over DSRC links 414-416 in ad-hoc communication network B. Spatial compute device 406 notifies ASF 424 of its gaming application username and its use of the interactive gaming application over ad-hoc communication network B. Spatial compute devices 404-406 may use additional applications over ad-hoc communication network B in a like manner. The description continues below with respect to FIG. 5.

Figure 5:
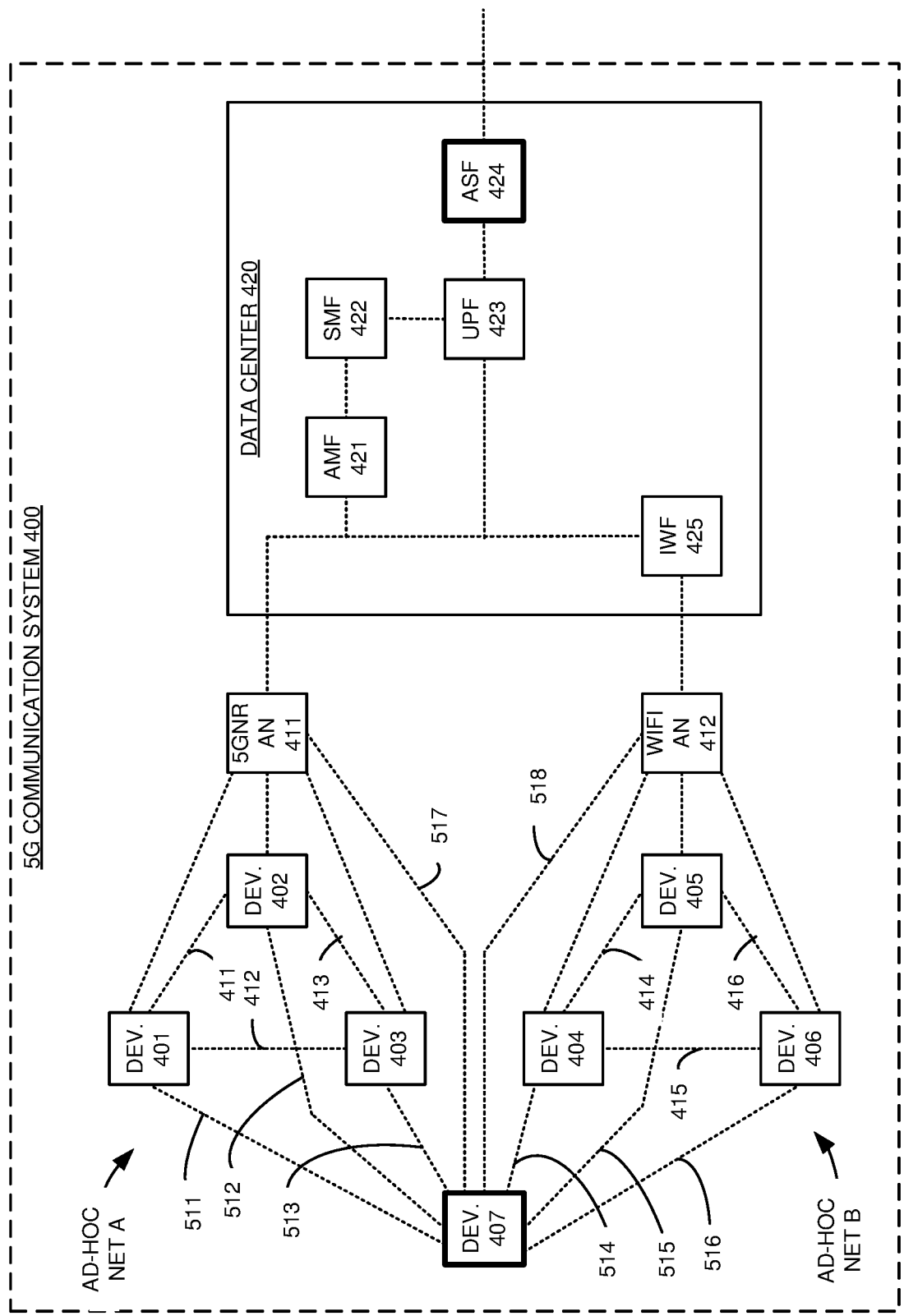
FIG. 5 illustrates the exemplary 5G communication network to deliver the user applications to the spatial compute devices over the ad-hoc communication networks.

FIG. 5 illustrates exemplary 5G communication network 400 to serve spatial compute devices 401-407 over ad-hoc communication networks A and B. The description of FIG.

5 follows from the above description of FIG. 4. Spatial compute device 407 attaches 5GNR AN 411 over 5GNR link 517 and/or to WIFI AN 412 over WIFI link 518. Spatial compute device 407 registers with AMF over 5GNR AN 411 and/or WIFI AN 412 and IWF 425. Spatial compute device 407 interacts with ASF 424 over 5GNR AN 411 and UPF 423 and/or WIFI AN 412, IWF 425, and UPF 423. Spatial compute device 407 detects both ad-hoc communication networks A and B. Spatial compute device 407 queries ASF 424 for information for ad-hoc communication networks A and B. ASF 424 translates ad-hoc communication network A into the VR application, the VR application usernames for spatial compute devices 401-403, and ad-hoc communication network A. ASF 424 translates ad-hoc communication network B into the interactive gaming application, the gaming application usernames for spatial compute devices 404-406, and ad-hoc communication network B.

ASF 424 indicates the VR application on ad-hoc network A and the VR application usernames for spatial compute devices 401-403 to spatial compute device 407. ASF 424 further indicates the interactive gaming application on ad-hoc network B and the gaming application usernames for spatial compute devices 404-406 to spatial compute device 407. Spatial compute device 407 displays a prompt to use the VR application with the gaming application usernames for spatial compute devices 401-403 over ad-hoc communication network A. Spatial compute device 407 displays another prompt to use the interactive gaming application with the gaming application usernames for spatial compute devices 404-406 over ad-hoc communication network B. In response, spatial compute device 407 receives user instructions to join ad-hoc communication network A and use the VR application and to join ad-hoc communication network B and use the interactive gaming application. Spatial compute device 407 and spatial compute devices 401-403 establish respective 5GNR links 511-513. Spatial compute devices 401-403 and 407 exchange VR application data over 5GNR links 411-413 and 511-513 in ad-hoc communication network A. Spatial compute device 407 and spatial compute devices 404-406 establish respective DSRC links 514-516. Spatial compute devices 404-407 exchange interactive gaming application data over DSRC links 414-416 and 514-516 in ad-hoc communication network B. Spatial compute device 407 notifies ASF 424 of its VR application username and its use of the VR application over ad-hoc communication network A. Spatial compute device 407 also notifies ASF 424 of its gaming application username and its use of the interactive gaming application over ad-hoc communication network B. Spatial compute device 407 may use additional applications over ad-hoc communication networks A and B in a like manner. Spatial compute device 407 may interact with ASF 424 over WIFI AN 412, IWF 425, and UPF 423 instead of 5GNR AN 411.

In some examples, spatial compute device 407 interacts with spatial compute devices 401-406 over ASF 424 instead of ad-hoc networks A and B. For example, spatial compute device 407 may interact with spatial compute devices 401-403 over ASF 424 instead of ad-hoc network A—and spatial compute devices 401-403 and 407 may use either the WIFI link (WIFI AN 412-IWF 425-UPF 423) or the 5GNR link (5GNR AN 411-UPF 423) to access ASF 424. Spatial compute device 407 may interact with spatial compute devices 404-406 over ASF 424 instead of ad-hoc network B—and spatial compute devices 404-407 may use either the WIFI link or the 5GNR link to access ASF 424. The use of ad-hoc networks A-B or ANs 411-412 for the individual user applications and application usernames is controlled by the user of spatial compute device 407 and may be automatically selected by spatial compute device 407 based on data communication quality. Spatial compute devices 401-406 and other spatial compute devices could be configured and operate like spatial compute device 407.

Figure 6:
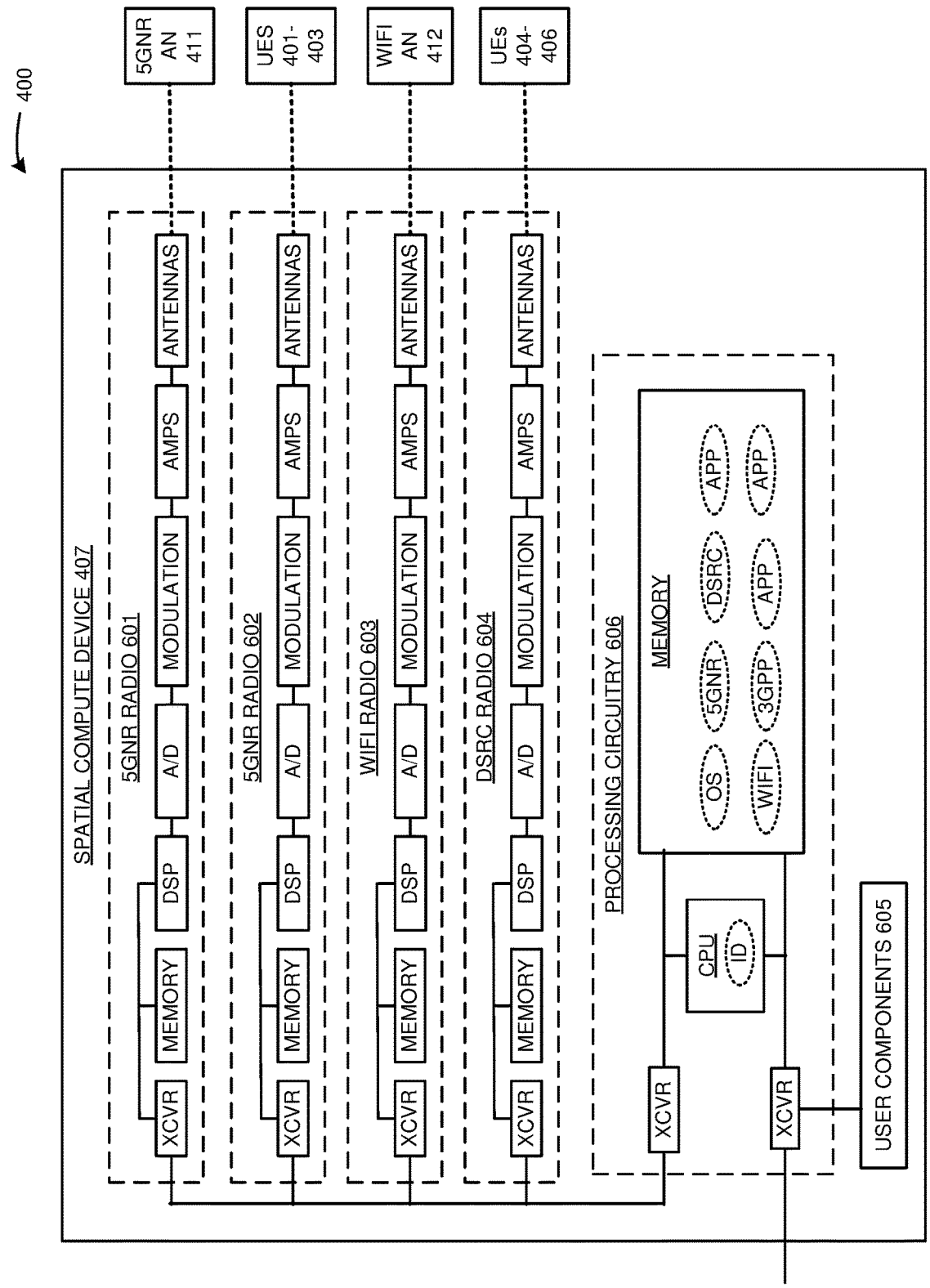
FIG. 6 illustrates an exemplary spatial compute device in the 5G communication network.

FIG. 6 illustrates exemplary spatial compute device 407 in 5G communication network 400. Spatial compute device 407 comprises an example of spatial compute devices 101-108 and 401-406, although spatial compute devices 101-108 and 401-406 may differ. Spatial compute device 407 comprises 5GNR radios 601-602, WIFI radio 603, DSRC radio 604, user components 605, and processing circuitry 606. Radios 601-604 comprise antennas, amplifiers, filters, modulation, analog-to-digital interfaces, DSP, memory, and transceivers that are coupled over bus circuitry. User components 605 comprise displays, speakers, microphones, controllers, and/or some other user apparatus. Processing circuitry 606 comprises CPU, memory, and transceivers (XCVRs) that are coupled over bus circuitry. The memory in processing circuitry 606 stores an operating system (OS), Third Generation Partnership Project applications (3GPP), applications (5GNR), DSRC applications (DSRC), WIFI applications (WIFI), and user applications (APP) for gaming, VR, and AR.

The antennas in 5GNR radio 601 exchange 5GNR signals with 5GNR AN 411. The antennas in 5GNR radio 602 exchange 5GNR signals with spatial compute devices 401-403 over ad-hoc network A. The antennas in WIFI radio 603 exchange WIFI signals with WIFI AN 412. The antennas in DSRC radio 604 exchange DSRC signals with spatial compute devices 404-406 over ad-hoc network B. User components 605 and the transceivers in radios 601-604 are coupled to transceivers in processing circuitry 606. In processing circuitry 606, the CPU retrieves the operating system and applications from the memory and executes the operating system and applications to operate spatial compute device 407 as described herein.

Figure 7:
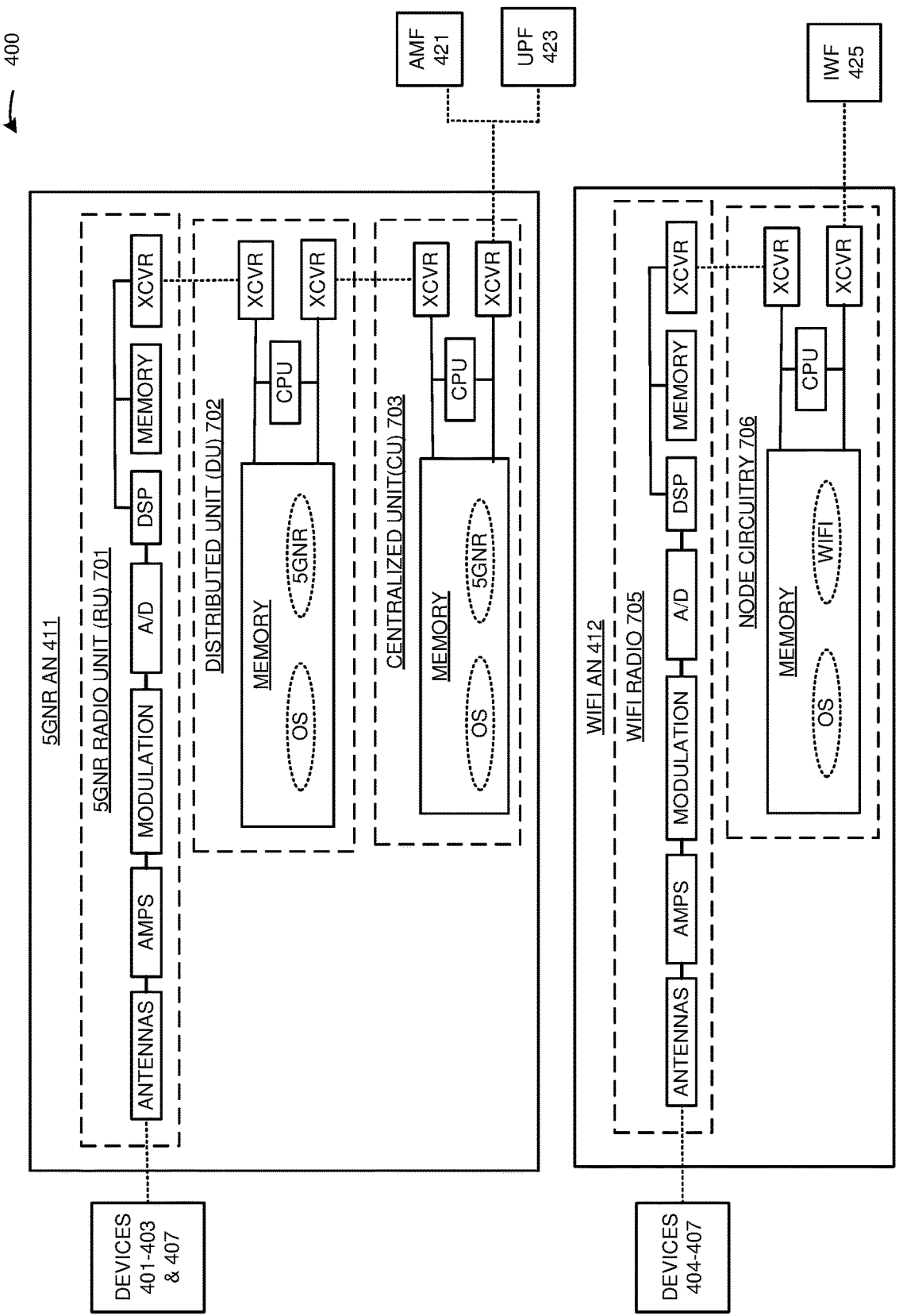
FIG. 7 illustrates exemplary access nodes in the 5G communication network.

FIG. 7 illustrates exemplary 5GNR AN 411 and WIFI AN 412 in 5G communication network 400. ANs 411-412 comprise examples of access networks 120, although networks 120 may differ. 5GNR AN 411 comprises 5GNR Radio Unit (RU) 701, Distributed Unit (DU) 702, and Centralized Unit (CU) 703. 5GNR RU 701 comprises antennas, amplifiers, filters, modulation, analog-to-digital interfaces, DSP, memory, radio applications, and transceivers that are coupled over bus circuitry. DU 702 comprises memory, CPU, user interfaces and components, and transceivers that are coupled over bus circuitry. The memory in DU 702 stores operating system and 5GNR network applications for physical layer, media access control, and radio link control. CU 703 comprises memory, CPU, and transceivers that are coupled over bus circuitry. The memory in CU 603 stores an operating system and 5GNR network applications for packet data convergence protocol, service data adaption protocol, and radio resource control.

The antennas in 5GNR RU 701 are wirelessly coupled to spatial compute devices 401-403 and 407 over 5GNR links. Transceivers in 5GNR RU 701 are coupled to transceivers in DU 702. Transceivers in DU 702 are coupled to transceivers in CU 703. Transceivers in CU 703 are coupled AMF 421 and UPF 423. The DSP and CPU in RU 701, DU 702, and CU 703 execute the radio applications, operating systems, and network applications to exchange data and signaling with spatial compute devices 401-403, spatial compute device 407, AMF 421, and UPF 423. In particular, the 5GNR radio resource control in CU 703 may schedule 5GNR resource blocks between spatial compute devices to form point-to-point 5GNR links 411-413 and 511-513.

WIFI AN 411 comprises WIFI radio 705 and node circuitry 706. WIFI radio 705 comprises antennas, amplifiers, filters, modulation, analog-to-digital interfaces, DSP, memory, radio applications, and transceivers that are coupled over bus circuitry. Node circuitry 706 comprises memory, CPU, and transceivers that are coupled over bus circuitry. The memory in node circuitry 706 stores operating system and WIFI applications. The antennas in WIFI radio 705 are wirelessly coupled to spatial compute devices 404-407 over WIFI links. Transceivers in WIFI radio 705 are coupled to transceivers in node circuitry 706. Transceivers in node circuitry 706 are coupled to IWF 425. The CPU in node circuitry 706 execute the WIFI applications and operating systems to exchange data and signaling with spatial compute devices 404-407 and IWF 425.

Figure 8:
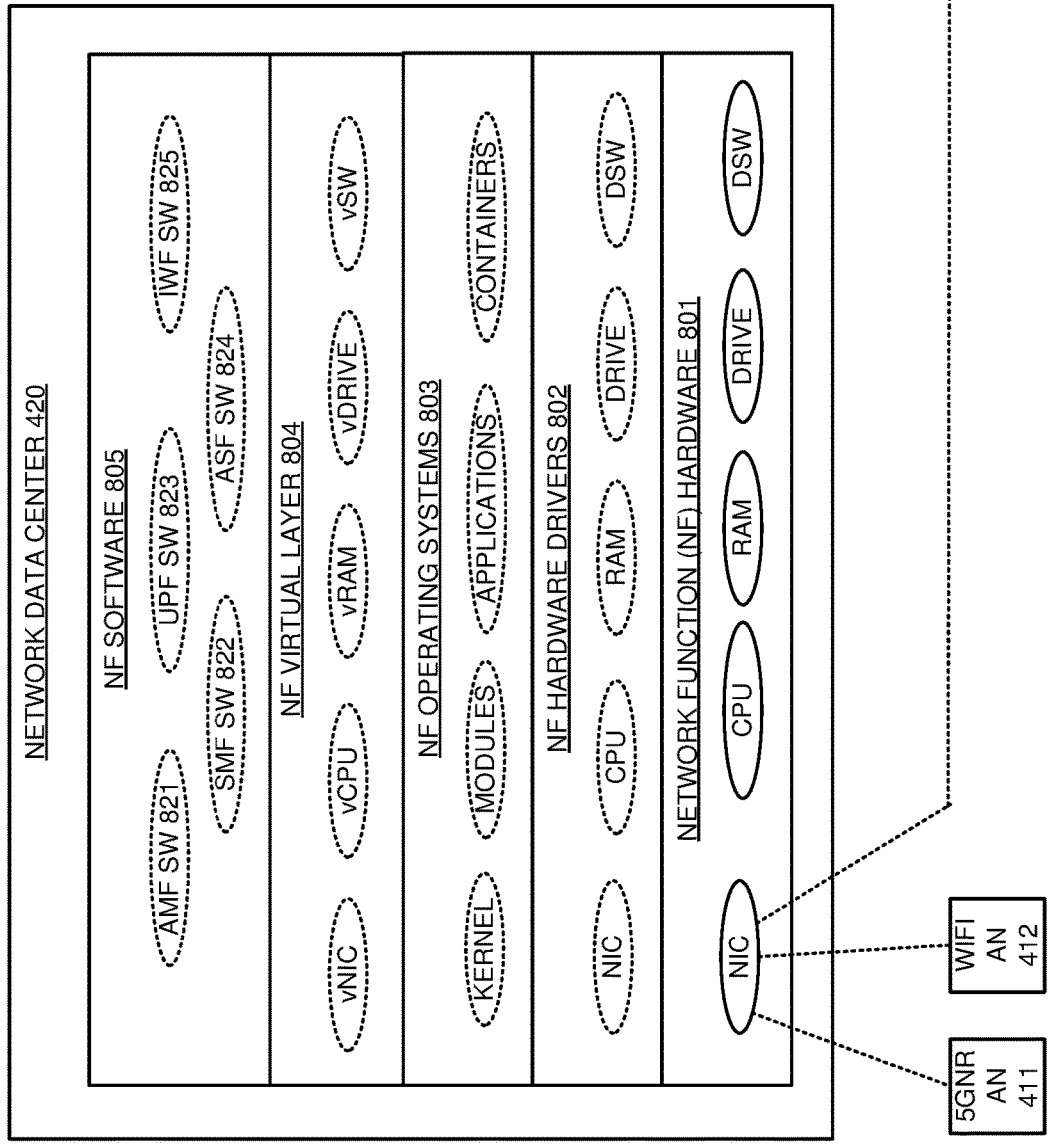
FIG. 8 illustrates an exemplary data center in the 5G communication network.

FIG. 8 illustrates exemplary data center 420 in 5G communication system 400. Network data center 420 comprises an example of access networks 120 and application server system 130, although networks 120 and system 130 may differ. Network data center 420 comprises Network Function (NF) hardware 801, NF hardware drivers 802, NF operating systems 803, NF virtual layer 804, and NF Software (SW) 805. NF hardware 801 comprises Network Interface Cards (NICs), CPU, RAM, Flash/Disk Drives (DRIVE), and Data Switches (DSW). NF hardware drivers 802 comprise software that is resident in the NIC, CPU, RAM, DRIVE, and DSW. NF operating systems 803 comprise kernels, modules, and applications that form containers for virtual layer and NF software execution. NF virtual layer 804 comprises vNIC, vCPU, vRAM, vDRIVE, and vSW. NF SW 805 comprises AMF SW 821, SMF SW 822, UPF SW 823, ASF SW 824, and IWF SW 825. Other NF SW like Network Repository Function (NRF) SW is typically present but is omitted for clarity. Network data center 420 may be located at a single site or be distributed across multiple geographic locations. The NIC in NF hardware 801 are coupled to 5GNR AN 411, WIFI AN 412, and external systems. NF hardware 801 executes NF hardware drivers 802, NF operating systems 803, NF virtual layer 804, and NF SW 805 to form and operate AMF 421, SMF 422, UPF 423, ASF 424, and IWF SW 425 as described herein. In particular, AMF 421, SMF 422, UPF 423, and IWF 425 serve spatial compute device access to ASF 424. ASF 424 serves user application information for ad-hoc networks including the individual application users. ASF 424 also serves connectivity for some user applications and hosts other user applications.

Figure 9:
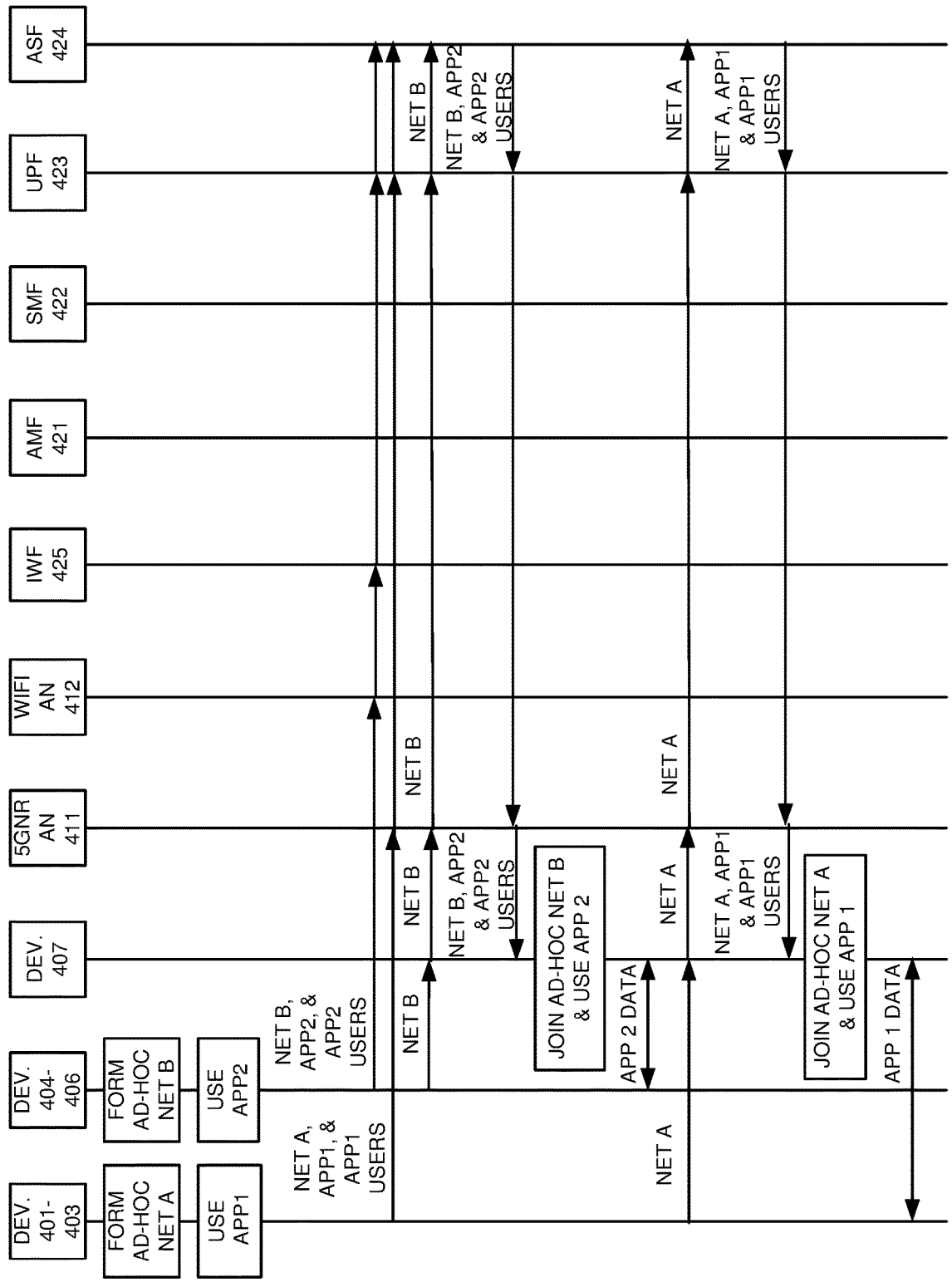
FIG. 9 illustrates an exemplary operation of the 5G communication network to deliver the user applications to the spatial compute devices over the ad-hoc communication networks.

FIG. 9 illustrates an exemplary operation of 5G communication network 400 to deliver user applications to spatial compute devices (DEV.) 401-407 over the ad-hoc communication networks A and B. The operation may differ in other examples. Representative user applications 1-2 are used in this example, and user applications 1-2 could be for gaming, AR, VR, or some other user service. Spatial compute devices 401-403 form ad-hoc communication network A, execute user application 1, and exchange application 1 data over point-to-point 5GNR links. Spatial compute devices 404-406 form ad-hoc communication network B, execute user application 2, and exchange application 2 data over point-to-point DSRC links. Spatial compute devices 404-406 individually report their use of network application 2, ad-hoc communication network B, and their own application 2 usernames to ASF 424 over WIFI AN 412, IWF 425, and UPF 423. Spatial compute devices 401-403 individually report their use of network application 1, ad-hoc communication network A, and their own application 1 usernames to ASF 424 over 5GNR AN 411 and UPF 423.

Figure 10:
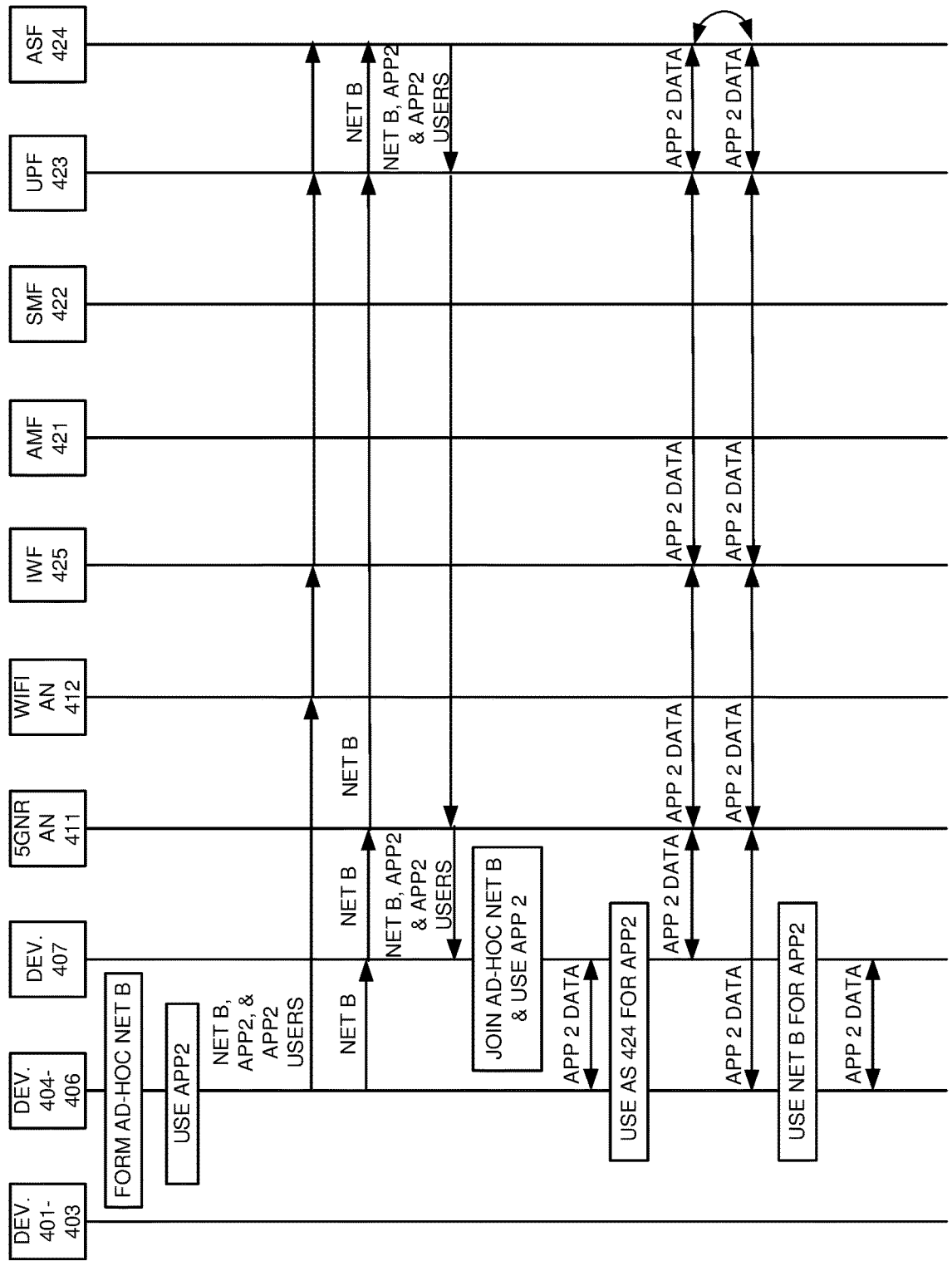
FIG. 10 illustrates an exemplary operation of the 5G communication network to deliver the user applications to the spatial compute devices over the ad-hoc communication networks.

Spatial compute device 407 detects ad-hoc communication network B and queries ASF 424 over 5GNR AN 411 and UPF 423. ASF 424 translates ad-hoc network B into user application 2 and its application 2 usernames. ASF 424 responds to spatial compute device 407 with user application 2 and its application 2 usernames for ad-hoc communication network B. In response to a user prompt and selection, spatial compute device 407 joins ad-hoc communication network B and executes user application 2. Spatial compute devices 401-403 and 407 exchange data for user application 2 over ad-hoc communication network B. For example, user application 2 could be a VR application, and the VR application usernames could share VR application data over ad-hoc communication network B Spatial compute device 407 detects ad-hoc communication network A and queries ASF 424 over 5GNR AN 411 and UPF 423. ASF 424 translates ad-hoc network A into user application 1 and its application usernames. ASF 424 responds to spatial compute device 407 with user application 1 and its application usernames for ad-hoc communication network A. In response to a user prompt and selection, spatial compute device 407 joins ad-hoc communication network A and executes user application 1. Spatial compute devices 401-403 and 407 exchange data for user application 1 over ad-hoc communication network A. For example, user application 1 could be an interactive gaming application and the gaming application usernames share gaming application data over ad-hoc communication network A FIG. 10 illustrates an exemplary operation of 5G communication network 400 to deliver the user applications to spatial compute devices (DEV.) 401-407 over ad-hoc communication networks A and B. The operation may differ in other examples. Spatial compute devices 404-406 form ad-hoc communication network B and execute user application 2. Spatial compute devices 404-406 individually report their use of network application 2, ad-hoc communication network B, and their own application usernames to ASF 424. Spatial compute device 407 detects ad-hoc communication network B and queries ASF 424 over 5GNR AN 411 and UPF 423. ASF 424 translates ad-hoc communication network B into user application 2 and its application 2 usernames. ASF 424 responds to spatial compute device 407 with user application 2 and its application 2 usernames for ad-hoc communication network B. Spatial compute device 407 joins ad-hoc communication network B and executes user application 2. Spatial compute devices 401-403 and 407 exchange data for user application 2 over ad-hoc communication network B. For example, user application 2 could be an AR application and the AR application usernames share AR application data over ad-hoc communication network A.

Spatial compute device 407 receives a user instruction to use ASF 424 to interact with spatial compute devices 404-406 for user application 2. In response, spatial compute device 407 interacts with spatial compute devices 404-406 for user application 2 over 5GNR AN 411, UPF 423, ASF 424, UPF 423, IWF 425, and WIFI AN 412. Spatial compute devices 404-406 may opt to use ASF 424 in a similar manner. ASF 424 could host user application 2 for spatial compute devices 404-407 in a client server mode. Spatial compute device 407 then receives a user instruction to use ad-hoc communication network B to interact with spatial compute device 404-406 for user application 2. In response, spatial compute device 407 rejoins ad-hoc communication network B and directly interacts with spatial compute devices 404-406 for user application 2.

The wireless data network circuitry described above comprises computer hardware and software that form special-purpose wireless network circuitry to serve spatial compute devices over ad-hoc communication networks. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless network circuitry to serve spatial compute devices over ad-hoc communication networks.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication system to serve spatial compute devices and a new spatial compute device over ad-hoc communication networks, the method comprising:

the spatial compute devices wirelessly forming the ad-hoc communication networks that comprise point-to-point wireless links between the spatial compute devices, wirelessly exchanging application data between user applications for application users over the ad-hoc communication networks, and transferring network data for delivery to an application server system that indicates the ad-hoc communication networks, the user applications that are currently using the ad-hoc communication networks, and the application users that are currently using the user applications;

the application server system receiving and storing the network data;

the new spatial compute device wirelessly detecting one of the ad-hoc communication networks and transferring a network query for delivery to the application server system that indicates the detected one of the ad-hoc communication networks;

the application server system receiving the network query, and in response, transferring a network response for delivery to the new spatial compute device that indicates ones of the application users that are currently using ones of the user applications over the detected one of the ad-hoc communication networks; and the new spatial compute device receiving the network response and presenting to a user the ones of the application users that are currently using the ones of the user applications over the detected one of the ad-hoc communication networks, and in response, receiving a user selection of a selected one of the user applications and wirelessly exchanging new application data for the selected one of the user applications over the detected one of the ad-hoc communication networks.

2. The method of claim 1 wherein the user selection indicates a new application user for the selected one of the user applications and further comprising:

the new spatial compute device transferring a user report for delivery to the application server system that indicates the new application user is currently using the selected one of the user applications over the detected one of the ad-hoc communication networks; and the application server system receiving and storing the user report.

3. The method of claim 1 wherein at least some of the point-to-point wireless links in the ad-hoc communication networks comprise Direct Short Range Radio Communication (DSRC) links.

4. The method of claim 1 wherein at least some of the point-to-point wireless links in the ad-hoc communication networks comprise Fifth Generation New Radio (5GNR) links.

5. The method of claim 1 further comprising:

the new spatial compute device presenting to the user a network option to use the application server system for the selected one of the user applications instead of the detected one of the ad-hoc communication networks; and the new spatial compute device receiving another user selection of the network option, and in response, exchanging additional application data for the selected one of the user applications with the application server system instead of using the detected one of the ad-hoc communication networks.

6. The method of claim 1 further comprising:

the new spatial compute device presenting to the user a network option to use a Fifth Generation New Radio (5GNR) communication network and the application server system for the selected one of the user applications instead of the detected one of the ad-hoc communication networks; and the new spatial compute device receiving another user selection of the network option, and in response, exchanging additional application data for the selected one of the user applications with the application server system over the 5GNR communication network instead of using the detected one of the ad-hoc communication networks.

7. The method of claim 1 further comprising:
the new spatial compute device presenting to the user a network option to use an Institute of Electrical and Electronic Engineers (IEEE) 802.11 (WIFI) access node and the application server system for the selected one of the user applications instead of the detected one of the ad-hoc communication networks; and
the new spatial compute device receiving another user selection of the network option, and in response, exchanging additional application data for the selected one of the user applications with the application server system over the WIFI access node instead of using the detected one of the ad-hoc communication networks.

8. The method of claim 1 wherein the selected one of the user applications comprises a gaming application.

9. The method of claim 1 wherein the selected one of the user applications comprises an Augmented Reality (AR) application.

10. The method of claim 1 wherein the selected one of the user applications comprises a Virtual Reality (VR) application.

11. A wireless communication system to serve spatial compute devices and a new spatial compute device over ad-hoc communication networks, the wireless communication system comprising:
the spatial compute devices configured to wirelessly form the ad-hoc communication networks that comprise point-to-point wireless links between the spatial compute devices, wirelessly exchange application data between user applications for application users over the ad-hoc communication networks, and transfer network data for delivery to an application server system that indicates the ad-hoc communication networks, the user applications that are currently using the ad-hoc communication networks, and the application users that are currently using the user applications;
the application server system configured to receive and store the network data;
the new spatial compute device configured to wirelessly detect one of the ad-hoc communication networks and transfer a network query for delivery to the application server system that indicates the detected one of the ad-hoc communication networks;
the application server system configured to receive the network query, and in response, transfer a network response for delivery to the new spatial compute device that indicates ones of the application users that are currently using ones of the user applications over the detected one of the ad-hoc communication networks; and
the new spatial compute device configured to receive the network response and present to a user the ones of the application users that are currently using the ones of the user applications over the detected one of the ad-hoc communication networks, and in response, receive a user selection of a selected one of the user applications and wirelessly exchange new application data for the selected one of the user applications over the detected one of the ad-hoc communication networks.

12. The wireless communication system of claim 11 wherein the user selection indicates a new application user for the selected one of the user applications and further comprising:

the new spatial compute device configured to transfer a user report for delivery to the application server system that indicates the new application user is currently using the selected one of the user applications over the detected one of the ad-hoc communication networks; and
the application server system configured to receive and store the user report.

13. The wireless communication system of claim 11 wherein at least some of the point-to-point wireless links in the ad-hoc communication networks comprise Direct Short Range Radio Communication (DSRC) links.

14. The wireless communication system of claim 11 wherein at least some of the point-to-point wireless links in the ad-hoc communication networks comprise Fifth Generation New Radio (5GNR) links.

15. The wireless communication system of claim 11 further comprising:
the new spatial compute device configured to present to the user a network option to use the application server system for the selected one of the user applications instead of the detected one of the ad-hoc communication networks; and
the new spatial compute device configured to receive another user selection of the network option, and in response, exchange additional application data for the selected one of the user applications with the application server system instead of using the detected one of the ad-hoc communication networks.

16. The wireless communication system of claim 11 further comprising:
the new spatial compute device configured to present to the user a network option to use a Fifth Generation New Radio (5GNR) communication network and the application server system for the selected one of the user applications instead of the detected one of the ad-hoc communication networks; and
the new spatial compute device configured to receive another user selection of the network option, and in response, exchange additional application data for the selected one of the user applications with the application server system over the 5GNR communication network instead of using the detected one of the ad-hoc communication networks.

17. The wireless communication system of claim 11 further comprising:
the new spatial compute device configured to present to the user a network option to use an Institute of Electrical and Electronic Engineers (IEEE) 802.11 (WIFI) access node and the application server system for the selected one of the user applications instead of the detected one of the ad-hoc communication networks; and
the new spatial compute device configured to receive another user selection of the network option, and in response, exchange additional application data for the selected one of the user applications with the application server system over the WIFI access node instead of using the detected one of the ad-hoc communication networks.

18. The wireless communication system of claim 11 wherein the selected one of the user applications comprises a gaming application.

19. The wireless communication system of claim 11 wherein the selected one of the user applications comprises an Augmented Reality (AR) application.

20. The wireless communication system of claim 11 wherein the selected one of the user applications comprises a Virtual Reality (VR) application.

\* \* \* \* \*